C. A. BODDIE.
VOLTAGE REGULATOR SYSTEM.
APPLICATION FILED JUNE 18, 1919.
1,437,087.
Patented Nov. 28, 1922.
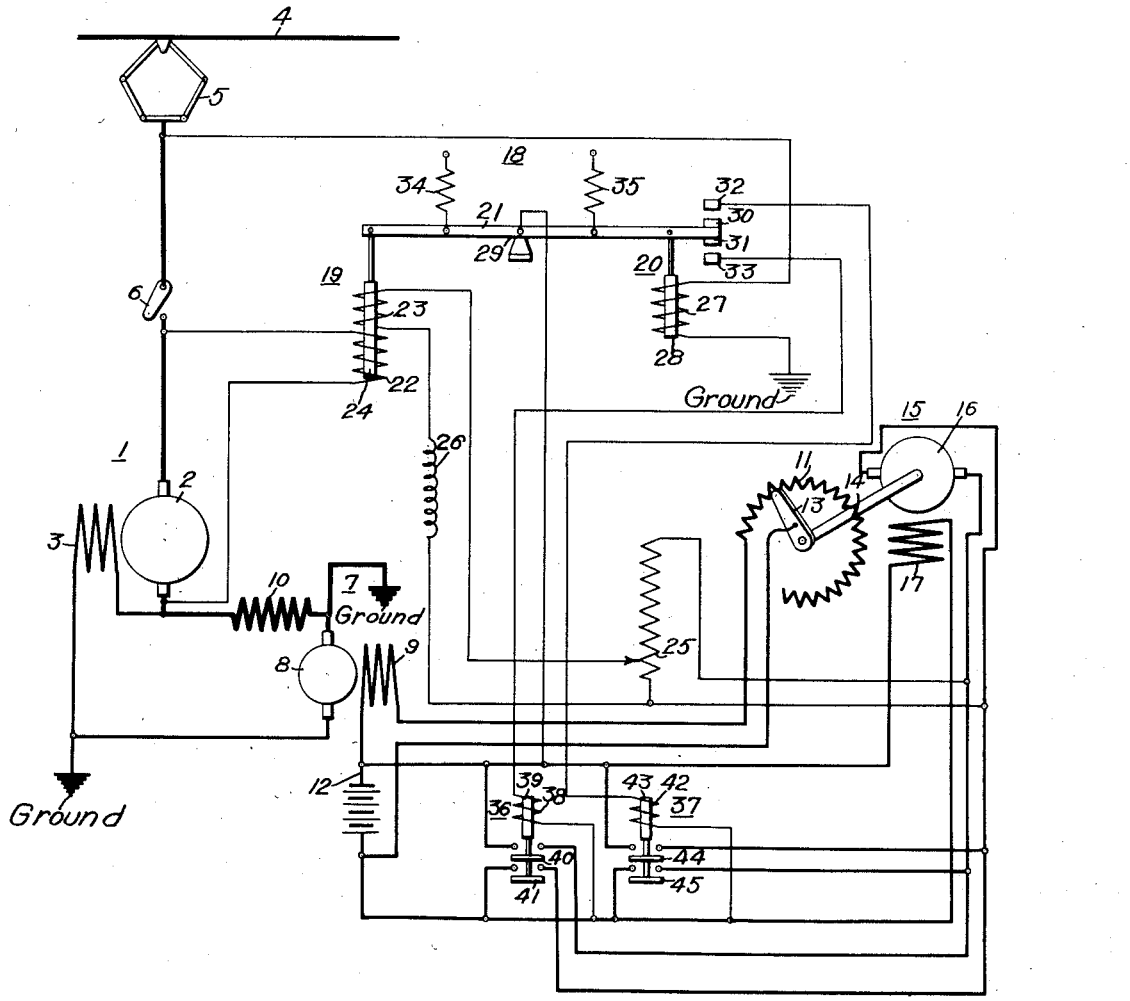

Patented Nov. 28, 1922.

1,437,087

UNITED STATES PATENT OFFICE.

CLARENCE A. BODDIE, OF PITTSBURGH, PENNSYLVANIA, ASSIGNOR TO WESTINGHOUSE ELECTRIC & MANUFACTURING COMPANY, A CORPORATION OF PENNSYLVANIA.

VOLTAGE-REGULATOR SYSTEM.

Application filed June 18, 1919. Serial No. 304,978.

*To all whom it may concern:*

Be it known that I, CLARENCE A. BODDIE, a citizen of the United States, and a resident of Pittsburgh, in the county of Allegheny and State of Pennsylvania, have invented a new and useful Improvement in Voltage-Regulator Systems, of which the following is a specification.

My invention relates to voltage-regulator systems and particularly to voltage-regulator systems for governing regenerative-control systems.

One object of my invention is to provide a voltage-regulator system that shall govern the regenerative voltage of an electric locomotive in a reliable and efficient manner and that shall be provided with means for preventing hunting action.

More specifically, my invention embodies a voltage regulator for automatically governing the excitation of the momentum-propelled motors on an electric locomotive in accordance with the voltage obtaining on the trolley-supply circuit which is connected to the locomotive, so as to automatically adjust the voltage generated by the motors to substantially the trolley-supply-circuit voltage and to permit the ready connection of the motors to the trolley circuit for regenerative operation without abrupt circuit changes.

During regenerative operation of a locomotive, it is necessary to excite the momentum-propelled motors of the locomotive in a manner to maintain the armature reaction above the voltage of the trolley-supply circuit so as to prevent the operating of the motors from the trolley-supply circuit. Thus, it is necessary for the momentum-propelled motors to generate a voltage of substantially the same value as the trolley-circuit voltage in order to prevent the motors from operating the locomotive.

In a voltage-regulator system constructed in accordance with my invention, a voltage regulator, which is operated in accordance with the difference between the trolley-circuit voltage and the voltage generated by the momentum-propelled motors of a locomotive, serves to control the excitation of the momentum-propelled motors to equalize the regenerative voltage with the voltage of the trolley circuit prior to the connecting of the motors to the trolley circuit for regenerative operation. Moreover, means is provided for changing the setting of the regulator to prevent hunting action.

In detail, one construction of my invention comprises a main control element having two electromagnets for jointly controlling the operation of a main contact arm. One of the electromagnets is provided with a winding which is energized in accordance with the trolley-circuit voltage and the second electromagnet is provided with a winding which is energized in accordance with the voltage generated by the momentum-propelled motor or motors of the locomotive. The main contact arm controls the operation of an auxiliary motor in a clockwise and in a counter-clockwise direction, and the auxiliary motor operates a rheostat which is included in the circuit of the exciter field windings. Thus, the excitation of the exciter generator is varied by the main control element in accordance with the difference between the voltage obtaining on the trolley circuit and the regenerative voltage to equalize the regenerative voltage with the voltage of the trolley circuit.

In order to prevent hunting action, the second electromagnet, that is controlled by the regenerative voltage, is provided with an auxiliary winding which is energized by the auxiliary motor circuit. A dynamic-braking resistor is connected across the auxiliary-motor circuit, and the auxiliary winding is connected in shunt to a portion of said dynamic-braking resistor so as to be operated in accordance with the energization of the auxiliary motor. The auxiliary winding opposes the initial operation of the contact arm to prevent hunting action.

The single figure of the accompanying drawing is a diagrammatic view of a regulator system embodying my invention.

Referring to the drawing, a motor 1, having an armature 2 and a field winding 3, is adapted to operate as a motor and as a generator and is connected to a trolley-supply conductor 4 by means of a suitable trolley 5, a suitable switch 6 being provided in the circuit of the motor 1 for disconnecting the motor from the trolley conductor when desired.

In the system disclosed in the drawing, a regulator system for an electric locomotive is shown associated with a single propelling motor but it is to be understood that any number of propelling motors on the locomotive may be controlled by the regulator in a like manner. No detail description is given of the regenerative-control circuits for the motor 1 and, for further information relative to the regenerative operation of the motor 1, attention is directed to the patent to R. E. Hellmund, No. 1,298,706, April 1, 1919.

An exciting generator 7, having an armature 8 and a field winding 9, is provided for exciting the field winding 3 of the main motor 1. The armature 8 is connected, through a regenerative resistor 10, to the field windings 3, and the exciter field windings 9 are connected, through a rheostat 11, to any constant-potential source of power, such as a battery 12. The contact arm 13 of the rheostat 11 is directly mounted upon the armature shaft 14 of an auxiliary motor 15 having an armature 16 and field winding 17.

A main control element 18, which is operated in accordance with the difference between the voltage obtaining upon the trolley circuit and the regenerative voltage of the motor 1, is provided for governing the operation of the auxiliary motor 15 in a clockwise and in a counter-clockwise direction. The main control element 18 comprises an electromagnet 19, which is operated in accordance with the regenerative voltage, and an electromagnet 20, which is operated in accordance with the voltage obtaining between a ground conductor and the trolley conductor 4, and a contact arm 21 which is jointly controlled by the two electromagnets 19 and 20.

The electromagnet 19 comprises a winding 22 which is directly connected across the armature 2 of the motor 1, an auxiliary winding 23 and a core armature 24, which is pivotally connected to one end of the contact arm 21. The auxiliary or anti-hunting winding 23 is connected in shunt to a portion of a dynamic-braking resistor 25 which is connected across the armature 16 of the auxiliary motor 15. An inductive reactance element 26 is inserted in the circuit of the auxiliary winding 23 in order to render its action somewhat sluggish and prevent chattering of the contact arm 21.

The electromagnet 20 comprises a winding 27, which is connected across the trolley supply circuit comprising the trolley conductor 4 and a ground conductor marked "Ground", and a core armature 28 which is pivotally connected to the contact arm 21 near the end opposite to the connection of the core armature 24 to the contact arm. The contact arm 21 is pivotally mounted at 29 intermediate the points of connection of the core armatures 24 and 28 and is provided with two main contact members 30 and 31 which engage co-operating contact members 32 and 33 according to the position of the contact arm. Two spring members 34 and 35 are connected to the contact arm 21 on opposite sides of the fulcrum point 29 to maintain the arm in a neutral position, with the contact members 30 and 31 disengaged from the contact members 32 and 33 when the electromagnets 19 and 20 are de-energized.

The main control element 18 selectively energizes two switches 36 and 37 which, in turn, control the operation of the auxiliary motor 15 for varying the voltage of the exciter generator 7 to control the regenerative voltage of the main motor 1. The switch 36 comprises a winding 38, which is connected across the battery 12 upon engagement between the main contact members 31 and 33, and a core armature 39. The core armature 39 operates two switch members 40 and 41 for connecting the armature 16 across the battery 12 to effect counter-clockwise rotation of the auxiliary motor 15.

The switch 37 comprises a winding 42, which is connected across the battery 12 upon engagement between the contact members 30 and 32, and a core armature 43. The core armature 43 operates two switch members 44 and 45 for connecting the armature 16 across the battery 12 to effect clockwise rotation of the auxiliary motor 15. The clockwise rotation of the auxiliary motor 15 increases the resistance included in the circuit of the exciter field windings 9 to decrease the exciter voltage and, accordingly, to decrease the excitation of the motor 1 to decrease the regenerative voltage. The operation of the auxiliary motor 15 in a counter-clockwise direction produces an opposite effect in a similar manner to increase the regenerative voltage of the motor 1.

Assuming the regenerative voltage of the main motor 1 to be below the voltage across the trolley supply circuit, the winding 27 of the electromagnet 20 is energized to overcome the action of the electromagnet 19 and to effect engagement between the main contact members 31 and 33. Upon engagement between the contact members 31 and 33, a circuit is completed from one terminal of the battery 12, through the contact arm 21, contact members 31 and 33, and the winding 38 of the switch 36, to the other terminal of the battery 12. Thereupon, the switch 36 is operated for connecting the armature 16 of the auxiliary motor 15 across the battery 12 to effect rotation of the motor in a counterclockwise direction. The field windings 17 of the auxiliary motor 15 are permanently connected across the battery 12. The counterclockwise rotation of the motor 15 decreases the resistance included in circuit with the field windings 9 to increase the voltage generated by the exciter 8; consequently, the excitation of the main motor 1 is increased to raise the value of the regenerative voltage.

In case the electromagnet 19 of the main control element 18 were controlled solely in accordance with the regenerative voltage, the contact arm 21 would not be operated to disengage the contact members 31 and 33 until the regenerative voltage had been raised to the desired point. If such were the case, it is apparent that the inertia of the various moving parts of the regulator and the auxiliary motor 15, together with the electrical inertia of the fields 3 and 9, would overcompensate the excitation of the exciter 7 to raise the regenerative voltage above the desired point and, consequently, would produce the so-called hunting action. In order to prevent this hunting action, the auxiliary winding 23 of the electromagnet 19 is energized, upon energization of the armature 16 of the auxiliary motor 15, to increase the strength of the electromagnet 19 and, consequently, to change the setting of the main control element 18. Thus, the electromagnet 19 overcomes the action of the electromagnet 20 to separate the contact members 31 and 33 just prior to the obtaining of the desired regenerative voltage so as to prevent hunting action.

In case the regenerative voltage is considerably above the voltage across the trolley-supply circuit, then the energization of the electromagnet 19 is increased to effect engagement between the contact members 30 and 32. Upon engagement between the contact members 30 and 32, a circuit is completed from one terminal of the battery 12 through the contact arm 21, contact members 30 and 32, and the winding 42 of the switch 37 to the other terminal of the battery 12. Thereupon, the switch 37 is operated for energizing the armature 16 to effect clockwise rotation of the auxiliary motor 15. The clockwise rotation of the motor 15 operates the rheostat 11 to increase the resistance included in a circuit of the exciter field windings 9. Accordingly, the exciter voltage is reduced to reduce the excitation of the motor 1 and to decrease the regenerative voltage.

Inasmuch as the direction of the current flow through the armature 16 has been reversed, the direction of the current flow through the auxiliary winding 23 has been reversed so that the winding 23 opposes the action of the winding 22. Consequently, the setting of the main control element is changed in accordance with the operation of the auxiliary motor 15. Thus, the contact members 30 and 32 are separated just prior to the reducing of the regenerative voltage to the desired point in order to prevent hunting action. When the regenerative voltage of the motor 1 is adjusted to correspond to the voltage obtaining on the trolley circuit, the switch 6 is closed to connect the motor across the trolley circuit.

Modifications in the system and arrangement and location of parts may be made within the spirit and scope of my invention, and such modifications are intended to be covered by the appended claims.

I claim as my invention:

1. In a voltage-regulator system, the combination comprising two disconnected sources of power, a regulator operated in accordance with the difference in potential between said sources, and means governed by said regulator for controlling the voltage of one of said sources, said regulator having a stationary position under certain balanced-voltage conditions.

2. In a voltage-regulator system, the combination with a supply circuit and a generator adapted to be connected to said circuit, of a regulator operated in accordance with the difference between the voltage produced by said generator and the voltage on the supply circuit and means controlled by said regulator for governing the voltage produced by the generator, said regulator having a stationary position under certain balanced voltage conditions.

3. In a voltage-regulator system, the combination with a trolley circuit, a dynamo-electric machine adapted to be connected to said trolley circuit and to operate as a motor and as a generator, and an exciter generator for energizing the field windings of said dynamo-electric machine, of a regulator comprising an electromagnet energized in accordance with the voltage generated by said dynamo-electric machine and a second magnet energized in accordance with the trolley voltage, means operated by said electromagnets for controlling said exciter generator, and means associated with one of said magnets to prevent hunting action.

4. In a voltage-regulator system, the combination with a trolley circuit and a dynamo-electric machine adapted to be connected to said trolley circuit, of a regulator comprising an electromagnet energized in accordance with the supply circuit voltage, a second electromagnet energized in accordance with the voltage generated by said dynamo-electric machine, and means operated by said electromagnets for governing the excitation of said dynamo-electric machine, said regulator having a stationary position under certain balanced-voltage conditions.

5. In a voltage-regulator system, the combination with a trolley circuit, a dynamo-electric machine adapted to be connected to said trolley circuit to operate as a motor and as a generator, and an exciter generator for governing the excitation of said dynamo-electric machine, of a regulator comprising an electromagnet energized in accordance with the supply-circuit voltage, a *second electromagnet energized in accordance* with said machine voltage, a motor operated in a clockwise and in a counter-clockwise direction by said electromagnets, a rheostat controlled by said motor for governing the excitation of said exciter generator, and a second winding associated with said second electromagnet and energized by the motor circuit to prevent hunting action.

6. In a voltage-regulator system, the combination with a supply circuit, a main generator, and an exciter generator for exciting the field windings of the main generator, of a main control element comprising two electromagnets respectively energized in accordance with the voltage of the supply circuit and the voltage of the main generator, and serving to govern the operation of said exciter generator, and means for modifying the operation of one of said magnets to prevent hunting action.

7. In a voltage-regulator system, the combination comprising two sources of power, a regulator having two electromagnets respectively energized by said sources, a dynamo-electric machine controlled by said electromagnets, and an auxiliary winding associated with one of said electromagnets and energized by said machine to prevent hunting action by the regulator.

8. In a voltage-regulator system, the combination comprising a main control element having two electromagnets energized under different circuit conditions, a motor controlled by said main control element, and an auxiliary winding energized by the motor circuit and associated with one of said electromagnets for influencing the operation of the magnet to prevent hunting action by the main control element.

9. In a voltage-regulator system, the combination with a supply circuit and a generator adapted to be connected to the supply circuit, of a main control element operated in accordance with the difference in potential between said generator and the supply circuit, means controlled by said element for governing the excitation of said generator and for preventing hunting action by the main control element.

10. In a voltage-regulator system, the combination with a supply circuit and a generator, of a main control element having two electromagnets respectively operated in accordance with the voltage of the supply circuit and the voltage produced by the generator, a motor controlled by said element, means for varying the operation of the main control element in accordance with the energization of said motor and means controlled by said motor for governing the excitation of said generator.

11. In a regulator system, a main control element comprising two co-operating *electromagnets energized under different circuit* conditions, one of said magnets having a main winding energized under various circuit conditions and an auxiliary winding, and means governed by said element for controlling the direction of current flow through the auxiliary winding to prevent hunting action by the element.

12. The combination with two disconnected sources of power, of means for regulating one of said sources, said means comprising a pivoted lever having independent electromagnets co-operating therewith, said electromagnets being respectively energized from said sources, and control means governed by said electromagnets.

13. The combination with two disconnected sources of power, of means for regulating one of said sources, said means comprising a pivoted lever having independent electromagnets co-operating therewith, said electromagnets being respectively energized from said sources, and control means governed by the differential action of said electromagnets.

14. The combination with two disconnected sources of power, of means for regulating one of said sources, said means comprising a pivoted lever having independent electromagnets co-operating therewith, said electromagnets being respectively energized from said sources, control means governed by said electromagnets, and anti-hunting means co-operating with said electromagnets.

15. The combination with two disconnected sources of power, of means for regulating one of said sources, said means comprising a pivoted lever having independent electromagnets co-operating therewith, said electromagnets being respectively energized from said sources, control means governed by the differential action of said electromagnets, and anti-hunting means co-operating with said electromagnets.

16. In a regulator system, the combination comprising two disconnected sources of power, a regulator operated in accordance with the difference in an electrical characteristic of said sources and having a neutral position under balanced conditions between said sources, means governed by said regulator for controlling one of said sources, and anti-hunting means co-operating therewith.

In testimony whereof, I have hereunto subscribed my name this 29th day of May 1919.

CLARENCE A. BODDIE.